United States Patent [19]

Greenlee et al.

[11] Patent Number: 5,143,975
[45] Date of Patent: Sep. 1, 1992

[54] POLYVINYL CHLORIDE BLENDS

[75] Inventors: William S. Greenlee, Avon Lake; Philip L. Kinson, Brecksville; Sally A. Kline, Westlake; Murali Rajagopalan; Charles A. Daniels, both of Avon Lake, all of Ohio

[73] Assignee: The B.F. Goodrich Company, Akron, Ohio

[21] Appl. No.: 698,018

[22] Filed: May 9, 1991

[51] Int. Cl.$^5$ .............................................. C08L 27/06
[52] U.S. Cl. ................................ 525/205; 525/84; 525/85; 525/86; 525/98; 525/194; 525/222; 525/227; 525/238; 525/239
[58] Field of Search ............... 525/239, 238, 205, 227, 525/84

[56] References Cited

U.S. PATENT DOCUMENTS

| | | | |
|---|---|---|---|
| 3,555,122 | 1/1971 | Simons | 525/239 |
| 3,660,320 | 5/1972 | Johnson et al. | 525/239 |
| 3,696,956 | 10/1972 | Merrill et al. | 525/239 |
| 3,711,576 | 1/1973 | Hwa | 525/239 |
| 3,766,106 | 10/1973 | Yurimoto et al. | 525/239 |
| 3,796,776 | 3/1974 | Ide et al. | 525/239 |
| 4,267,084 | 5/1981 | Mizutani et al. | 525/239 |
| 4,668,740 | 5/1987 | Okano | 525/239 |
| 4,914,154 | 4/1990 | Haller et al. | 525/239 |

FOREIGN PATENT DOCUMENTS 58-201833 11/1983 Japan .

OTHER PUBLICATIONS

Matthews et al. -Mol. Wgt. Characteristics of PVC Plastics 28 pp. 98-99-May 1963.

*Primary Examiner*—Carman J. Seccuro
*Attorney, Agent, or Firm*—Miles B. Dearth; Joe A. Powell

[57] ABSTRACT

Blend compositions are provided comprising first polyvinyl chloride and a second polyvinyl chloride wherein the inherent viscosity (I.V.) of the second polyvinyl chloride, measured in accordance with ASTM1243 is at least about 0.2 units higher than the I.V. of the first polyvinyl chloride. Preferably the I.V. of the second polyvinyl chloride is from 0.2 to 1.0 units higher than the I.V. of said first polyvinyl chloride, with the most preferred difference in I.V. ($\Delta$I.V.) being 0.35 to 0.65 units so as to yield a balance of property improvements including impact resistance, heat distortion temperature, melt flow and melt viscosity. The compositions also can further comprise melt flow enhancers and/or Tg enhancing agents. The blends of the present invention are processible by a variety of techniques including injection molding, extrusion, calendering, thermoforming, compression molding and the like to form useful articles such as molded sheets, trays, shrouds as for fans, appliance parts and covers, electrical outlets, business machine housings, telecommunication equipment, automotive components, and numerous others.

11 Claims, No Drawings

POLYVINYL CHLORIDE BLENDS

FIELD OF THE INVENTION

This invention relates to blends of rigid or semi-rigid polyvinyl chloride. In particular blends of PVC are disclosed having improved performance for utilization in injection molding, in particular, large or intricate articles such as appliance or office automation (AO) machine housings.

BACKGROUND

Thermoplastic vinyl based technology directed to replacement of metal and higher performance engineering thermoplastics in AO end-uses for instance, is gaining momentum. This is a departure from traditional uses pertaining to extrusion related PVC art. PVC, viewed from a commodity resin perspective, is known for limited dynamic thermal stability and high melt viscosity. As a result of advancements in resin quality and compound formulation, improved single phase PVC formulations directed to overcoming these and other limitations are making inroads in custom injection molding compound (CIM) for a variety of end-use markets including the aforesaid appliance and office automation (AO) business machine housing markets.

Specifically, the pertinent art is directed generally to providing higher melt flow and reduced melt viscosity of PVC compounds while maintining or desiredly improving heat deflection temperature (HDT). These are commercially valuable property combinations characteristic of higher valued, more crystalline engineering thermoplastics. U.S. Pat. Nos. 4,339,554, 4,458,046, and 4,469,845 describe PVC polyblends containing copolymers of styrene and maleimide. These disclosures are directed to various copolymers of styrene and imide derivatives of maleic anhydride blended with PVC resins in order to obtain increased HDT. Impact modifiers are suggested in U.S. Pat. Nos. 4,469,844 and 4,469,845 which describe improved polyblends of grafted rubber-modified vinyl chloride resins. The polyblends optionally contain ABS, MBS, or an ungrafted rubber and exhibit higher softening temperatures than that of the vinyl chloride resin.

U.S. Pat. No. 4,595,727 teaches a methacrylate derived imide blend with rubber modified PVC comprising: 10% to 90% by weight of a polyglutarimide with 90% to 10% by weight of rubber modified PVC. The polyglutarimide is prepared by reacting an acrylic polymer, particularly polymethyl methacrylate or a copolymer of methyl methacrylate and a minor amount of an ethylenically unsaturated comonomer, with an aminating agent such as ammonia or alkyl amine. The rubber-modified vinyl chloride resin is prepared by polymerization of vinyl chloride in the presence of 2 to 50 percent, based on the weight of the resin, of a rubber to form a graft copolymer.

Kokai application number 56-159243 describes a blend of glutarimide polymer exhibiting a higher heat deflection temperature, however it is also demonstrated that melt flow is reduced. For AO injection molding PVC based compounds, higher melt flow rates would be desired. Kokai application Number 2-142845 provides an improved melt flow component for a PVC/glutarimide blend comprising a polyolefin or polystyrene diblock with methacrylate, PVC, ε-caprolactone, EVA, SMA, and others. Preferred amounts of this diblock range from 0.5-10 weight parts. The glutarimide is present at 5-50 parts.

An approach aiming at direct modification of particulate PVC resin can be found in U.S. Pat. No. 4,814,387 pertaining to PVC treated with a low I.V., high glass transition temperature improving agent. The method of treatment is overpolymerization on PVC resin of a high glass transition temperature composition in combination with molecular weight modifying amounts of chain transfer agent. The overpolymerization component consists of polymerized monomers selected from styrene and its derivatives, vinyl nitriles, methacrylates, maleimides, with the preferred component consisting of a copolymer of α-methyl styrene and acrylonitrile.

A single phase morphology CPVC composition is disclosed in U.S. Pat. No. 4,847,331 wherein a blend of CPVC having a chlorine content of between about 60% and 66% by weight is combined with a polymethylmethacrylate comprising not more than 80% by weight of the blend. Within the specified chlorine content, the composition of matter displays homogeneous, substantially single phase behavior with the CPVC and polymethylmethacrylate being substantially or completely miscible. The resulting blended material exhibits enhanced temperature and durability properties and remains homogeneous up to a temperature of 230° C. CPVC generally exhibits significantly higher melt viscosity than a comparable molecular weight PVC. This is substantially a result of appreciably lower melt flow at useful chlorine levels of 63–67% yet these resins are established for higher continuous use temperatures.

A ternary blend of PVC/Polycarbonate/ABS is disclosed in U.S. Pat. No. 3,882,192. Particularly preferred blends contain from 30–50 parts of each component. The preferred method of preparation involves a first combination of PVC and ABS, followed by combination of this blend with polycarbonate. Impact strength and heat distortion temperature are notably enhanced.

A single phase PVC modified with a high melt flow shear modified polypropylene is disclosed in U.S. Pat. No. 4,665,118. This disclosure does not reveal that a significant limitation in attaining acceptable impact strength is observed with blends of the disclosed polyolefin and PVC. It is well established that this is an incompatible combination. The polypropylene acts generally as a fusion retardant in an external lubrication function. With regard to HDT, such a blend would result in no appreciable loss in HDT, however not an insignificant amount of an impact modifier would nonetheless be required. The presence of this modifier expectedly would decrease both melt flow and HDT which is an undesired effect.

U.S. Pat. No. 4,267,084 discloses a blend of a major amount of a first higher molecular weight (I.V.) PVC with a minor amount of a lower molecular weight PVC. The blend is disclosed as exhibiting improved thermal stability compared to a blend wherein the lower I.V. PVC is not modified with a mercaptan or disulfide compound. The compositions disclosed contain from 70 weight parts to about 90 weight parts of a PVC having degree of polymerization (DP) of 1020 and 1320, with 30 to 10 weight parts of a lower molecular weight PVC having DP of between 130 to about 580. In this blend it is the higher I.V. PVC which is present in the major amount and dominates the properties of the continuous phase.

Owing to the present variety of methods aimed at enhancing PVC compounds particularly for injection molding uses, the attendant antagonistic relationships between melt flow, impact modification and HDT remain as limitations for enhancements. It would be desirable to arrive at a PVC blend exhibiting adequate melt flow and inherently better impact properties thereby requiring less conventional impact modification. Attaining the desired level of impact strength with reduced levels of conventional impact modifiers would be advantageous due to the deleterious effects of these modifiers on melt flow rate, melt viscosity, HDT, weatherability and dynamic thermal stability.

SUMMARY OF THE INVENTION

It is therefore an aspect of the present invention to provide blends of a first and second PVC (PVC/PVC) selected according to a relationship between said resins relative to differences in inherent viscosity (ΔI.V.) between the two said resins so as to yield a desired combination of property improvements.

It is another aspect of the present invention to provide a blend of said first and second PVC which exhibits high melt flow achieved by selecting the two said resins based on this ΔI.V. relationship.

In a further aspect of the present invention the blends can further comprise a Tg enhancing agent and exhibit elevated annealed heat distortion temperatures in addition to exhibiting adequate melt flow desired especially for injection molding processes. These objects are achieved in a blend comprising a major amount of a PVC having a lower I.V. relative to a minor amount of a higher I.V. PVC blended therewith, said difference in I.V. is specified herein below within preferred ranges. Specifically, these aspects are achieved in a blend composition comprising a major proportion of a first polyvinyl chloride polymer having an inherent viscosity (I.V.) measured per ASTM-D1243 of between 0.2 and 2.0 and a minor proportion of a second polyvinyl chloride polymer having an inherent viscosity between 0.4 and 2.5 wherein said inherent viscosity for said second polyvinyl chloride must be at least 0.2 I.V. units higher but preferably not more than about 1.0 I.V. units higher, provided that the ΔI.V. can lie between about 1.0 and 2.0 units when the amount of the higher I.V. PVC does not exceed about 20 weight parts per 100 weight parts of the total PVC. Surprisingly the beneficial effects occur when the second PVC is present at between about 0.1 to about 5 weight parts per 100 weight parts total PVC.

DETAILED DESCRIPTION

Polyvinyl chloride resin as referred to in this specification includes polyvinyl chloride homopolymers, vinyl chloride copolymers, graft copolymers, vinyl halide polymers polymerized in the presence of any other polymer such as a high heat distortion temperature enhancing polymer, impact toughener, barrier polymer, chain transfer agent, stabilizer, plasticizer or flow modifier. For example a combination of modifications may be made with the PVC polymer by overpolymerizing a low viscosity, high glass transition temperature (Tg) enhancing agent in the presence of a chain transfer agent. Such a method is disclosed in U.S. Pat. No. 4,814,387 incorporated herein by reference. In another alternative vinyl chloride may be polymerized in the presence of said Tg enhancing agent, the agent having been formed prior to or during the vinyl chloride polymerization.

Where the selected PVC is a vinyl chloride copolymer, any monomer copolymerizable with vinyl chloride and known in the art may be employed, thus, the practice of the present invention does not preclude selection of one or more than one comonomer. Such co-polymerizable monomers for PVC include olefins, diolefins, acrylate esters, methacrylate esters, styrene derivatives, acrylonitrile, vinyl esters, vinylidene chloride, vinyl ethers. Crosslinking comonomers such as allyl methacrylate, and diallyl phthalate are preferably absent. Preferred comonomers include ethylene, propylene, 1-butene, 2-butene, 1-pentene, 1-hexene, isobutylene and vinylidene chloride. The most preferred comonomers are ethylene, propylene, 1-butene and isobutylene. The amount of comonomer that may be polymerized with vinyl chloride is a function of the choice of comonomer, as is well understood by those skilled in the art. Most preferably, the first polyvinyl chloride polymer as well as the second polyvinyl chloride blended therewith are polyvinyl chloride homopolymers or copolymers with the most preferred comonomer(s).

Of particular importance to the present invention is the I.V. of the first and second PVC resins. Each must be selected within a particular range in order to exhibit the property maxima shown below by way of the examples.

Inherent viscosity is defined as the ratio of the natural logarithm of the relative viscosity of a resin and the concentration in grams of the solution used to measure the viscosity. A method similar to ASTM-D 1243-58T Method A is employed to determine inherent viscosity of an 0.2 g sample in 100 ml of cyclohexanone at 30° C. These values have been related to the polymerization degree (JIS K 6721) and weight average molecular weight of a polymer as reported in *Plastics*, 28 98 (1963). The I.V. of the preferred first PVC can be chosen within the range of about 0.2 to about 1.0, more preferably from about 0.3 to 0.7. The I.V. of the preferred second PVC can be chosen within the range from about 0.6 to 1.9, more preferably from 0.8 to 1.6 and most preferably from 0.9 to 1.05 I.V.

As introduced above, a trade-off in melt flow versus I.V. exists for PVC. Conventional PVC flow enhancers such as α-methyl styrene polymers or high melt flow polypropylene generally are brittle. These do not provide toughening of the compound, and thus require additional impact modifiers. The approach of the present invention involves modifying PVC preferably not with an incompatible flow enhancer which may require further impact modifier and compatibilizer, but with a minor amount of a higher I.V. PVC. This approach provides a desired combination of properties. In particular, a relatively high melt flow PVC was blended with a minor amount of a second PVC having higher I.V. than the first PVC. This resulted in a reduction in the melt flow rate but not so severe as to limit practical processing of the blend. The reduction in melt flow rate was accompanied by unexpected improvements in tensile strength, elongation and impact toughness achieved without a significant loss in heat deflection performance. The preferred blends contain a minor proportion (in relation to total PVC) of a second PVC having an I.V. at least about 0.2 units higher than the I.V. of the first PVC and preferably a ΔI.V. of 0.2 to 1.0 I.V. with the most preferred ΔI.V. of from 0.35 to 0.65 units, the minor component PVC blended therewith always having the higher I.V. With this relationship acknowledged, a wide range of I.V. can be selected for both.

For example, a preferred first PVC polymer having an I.V. of from about 0.3 to about 0.7 can be selected in blends with a minor amount of a PVC polymer having the higher I.V. The I.V. of the minor component PVC (PVC2) which is optimum for a particular first major component PVC (PVC1) will be preferably from about 0.2 to about 1.0 I.V. units higher than the I.V. of the first PVC. Where the first PVC posesses the preferred I.V. relative to the I.V. for the second PVC employed, the preferred combination of properties can be achieved.

At a point where melt flow becomes generally inadequate for the intended molding processes as evidenced by spiral melt flow of less than about 25 inches (63 cm), an optional melt flow enhancing additive can be employed. Preferable flow enhancing additives are the aforementioned α-methyl styrene polymers and low acrylonitrile containing SAN copolymers in addition to modifications which can be made to the PVC polymer itself outlined above. Typical usage levels for melt flow enhancers would be about 0.2 to about 20 parts by weight based on 100 weight parts of the combined weights of PVC. Preferredly the levels of such melt flow enhancers are minimized by selecting the preferred PVC I.V. ranges so as to give adequate melt flow for the blend.

A conventional PVC resin can be prepared by any known polymerization process such as, but not limited to suspension, mass, solution, emulsion, dispersion and microsuspension techniques. A preferred process for preparing conventional polyvinyl chloride resin for use in this invention is the aqueous suspension process. The suspension process involves an agitated reaction medium during the entire reaction period. Water is the polymerization medium and a vinyl monomer to water ratio is selected in the range of about 1:1 to 1:10. Preferably a vinyl monomer: water ratio in the range of about 1:1 to 1:4 is employed.

Skinless PVC suspension resins may be used in the blends of the present invention. A preferred embodiment of the instant invention includes a skinless resin as the higher I.V. PVC of the blend. A method for preparing skinless PVC resins is disclosed in U.S. Pat. No. 4,711,908, incorporated herein by reference. High I.V. skinless resin has superior friability.

The particular inherent viscosities for the first and second PVC resins are generally controlled during the polymerization of each said resin by controlling polymerization temperature and/or by the use of chain transfer agents both techniques being known in the art.

Within the preferred ΔI.V. range, further variation of composition is contemplated by varying the weight ratio of PVC1 and PVC2. Generally, the higher I.V. PVC is present in amounts from 0.1 to about 49 weight parts, preferably from 0.1 to 30 weight parts, more preferably from 0.1 weight parts to 10 weight parts and most preferably from 1.0 to 5 weight parts per 100 weight parts of combined PVC in the blend.

The amount employed of the higher I.V. PVC component is efficient in achieving desired property improvements with as little as one weight part present, and at the same time heat distortion temperature is not appreciably sacrificed. Melt flow is not severely sacrificed and remains desiredly high for those blends which display an optimum balance of improved strength, impact resistance, HDT, and melt viscosity. Moreover it is understood that conventional impact modifiers generally act as melt flow suppressants, therefore, with reduced levels of impact modifier required in the blends of the present invention, a relative gain in melt flow is achieved.

The PVC1/PVC2 blend can contain effective amounts generally ranging from 0.5 to about 20 parts by weight per 100 weight parts PVC of various lubricants, and stabilizers known in the art. For example, various primary and/or secondary lubricants such as oxidized polyethylene, polypropylene, paraffin wax, fatty acids and the like can be utilized. Thermal and UV stabilizers can be utilized such as various organo tins, for example dibutyl tin, dibutyltin-S-S'-bis-(isooctylthioglycolate), dibutyl tin dilaurate, and dimethyl tin diisooctylthioglyate. Secondary stabilizers may be included for example a metal salt of phosphoric acid or various epoxidized oils. Specific examples of salts include water-soluble, alkali metal phosphate salts, disodium hydrogen phosphate, orthophosphates such as mono-,di-,and tri-orthophosphates of said alkali metals, alkali metal polyphosphates, -tetrapolyphosphates and -metaphosphates and the like. Typical levels of secondary stabilizers range from about 0.1 wt. parts to about 7.0 wt. parts per 100 wt. parts PVC. In addition, antioxidants such as phenolics, BHT, BHA, various hindered phenols and various inhibitors like substituted benzophenones can be utilized.

Inasmuch as high impact values are often desired, impact modifiers can be added, as noted above, which are known to the art as well as to the literature. For example, various impact modifiers can be utilized as set forth in The Encyclopedia of PVC, Volume 2, Chapter 12, Marcel Dekker, Inc., New York, 1977, which is hereby incorporated by reference. Examples of various specific impact modifiers include various acrylonitrile-butadiene-styrene (ABS) polymers, the various chlorinated polyethylenes, the various graft copolymers of acrylic rubbers, the various poly(ethylene-co-vinyl acetates), styrene-butadiene-styrene block copolymers, graft copolymers of methylmethacrylate, butadiene and styrene (MBS), graft copolymers of acrylonitrile, butadine and styrene (ABS) and the like. Impact modifiers of these types are commercially available. Preferred impact modifiers include ABS, MBS, graft copolymers of acrylic rubbers and chlorinated polyethylene. Regardless of the particular impact modifier utilized, the amounts thereof can naturally vary, depending upon the desired impact strength as typically measured by an Izod impact test (ASTM D256). The levels of impact modifier present can vary from about 1 to about 50 parts by weight, preferably from about 5 to about 20 parts by weight, and most preferably vary from 5 to 10 weight parts, per 100 weight parts of PVC1/PVC2. Accordingly, the blends of the present invention have the capacity to be impact-modified to achieve notched Izod values generally in excess of 100N·m/m, desirably in excess of 200N·m/m and preferredly in excess of 230N·m/m.

Various fillers, pigments and reinforcing materials can also be utilized in amounts up to about 200 or 300 parts by weight for every 100 parts by weight of the PVC blend. Examples of fillers include calcium carbonate, clay, silica and various silicates, talc, carbon black and the like. Reinforcing materials include glass fibers, polymer fibers and cellulose fibers. Such fillers are generally added in amounts of from about 3 to about 100 parts by weight for every 100 parts by weight of the combined PVC resins. Examples of various pigments include titanium dioxide, carbon black and the like.

Fillers, pigments or reinforcing mater, also can be combined.

Plasticizers may be included in any manner and amount. Exemplary plasticizers are set forth in *The Technology of Plasticizers*, by Sears and Darby, pages 893-1085, John Wiley and Sons, New York, 1982, which is incorporated herein by reference. Plasticizers typically lower the HDT and therefore are preferably avoided or present in minor amounts.

The compound in a fused, cubed state can be subsequently extruded, or injection molded or processed by any suitable melt processing equipment. The vinyl chloride polymers can also be mixed with the various additives in a high intensity mixer such as a Henschel mixer and then processed on an extruder into pellets or directly into a finished article. In general, any conventional means of compounding such as a Banbury mixer, two-roll mill, Henschel mixer, ribbon blender, compounding extruder, injection molding machine and the like can be used to produce fused articles of this invention.

The blended compounds of the present invention can be processed by a variety of techniques including injection molding, extrusion, calendering, thermoforming, compression molding and the like to form useful articles including molded sheets, trays, shrouds as for fans, appliance parts and covers, electrical outlets, business machine parts and housings, piping, automotive components and numerous others.

The invention will be better understood by reference to the following examples.

EXAMPLES 1-11

The examples in Table 2A employed a first PVC (PVC1) having an I.V. of 0.68 and a second PVC (PVC2) having an I.V. of 0.92. The amount of the second I.V. PVC was varied as was the level of impact modifier. All parts are expressed in parts by weight (pbw). In the examples 1-25, 3 pbw of lubricant, 2 pbw of tin stabilizer and 2 pbw of processing aid were also included which are commonly used in PVC compounding art.

The ingredients were hand mixed and then fluxed in a Banbury. The fused compounds were milled on a 2 roll mill. The compound was cubed and injected molded into standard test specimens. An Instron capillary rheometer was used to measure low shear viscosity in poise (p) at 149 reciprocal seconds. Izod impact tests were conducted for notched copper case (N) and unnotched (UN) specimens, at room temperature and −40° C. Testing of the molded specimens was performed by the methods of Table 1.

TABLE 1

| | Method | Units |
|---|---|---|
| Annealed Heat Distortion Temp. | ASTM D648 | °C. |
| Izod Impact Resistance | ASTM D250 | J/M of notch |
| Spiral Mold Flow | see below | inches |

Spiral mold flow is a measure of the length of a standardized injection shot and is a relative indication of injection melt flowability under a fixed work input. The test predicts limitations in size and configuration of injection molding dies for a given resin compound. The test employs a graduated spiral flow mold with defined cross section used in conjunction with a Boy Inc. injection molding machine. Generally, the mold temperature is set within a range from 20° C. to about 75° C., and injection melt pressure is constant. A screw having a L/D typically greater than 15 is used. For every compound at least three consecutive shots were used for averages of spiral flow length measurement. The compositions in the examples were also evaluated for processing stability. A primary commercial measure of the relative thermal stability and processability of PVC compounds is the "dynamic thermal stability time" (DTS) in minutes. This test is designed to measure the time-torque relationship at selected temperatures using an instrument such as the Brabender Plasti-corder. The test value generally reported, and used for comparison, is the "DTS time". DTS time is herein defined as the time required for the samples taken at two minute intervals from the melted mass in the Brabender bowl to turn to a relatively dark color. The experienced operator can accurately judge the point which represents degradation of the polymer. DTS time is dependent not only on polymer properties, but also on temperature, sample size, stabilizers, lubricants, instrument operating conditions, degree of instrument maintenance, and other conditions which are controlled for accurate comparison between different compounds.

TABLE 2A

| | I.V. | Example | | | | | |
| | | C1 | 2 | 3 | 4 | 5 | C6 |
|---|---|---|---|---|---|---|---|
| PVC1* | .68 | 100 | 99 | 95 | 90 | 80 | 100 |
| PVC2* | .92 | 0 | 1 | 5 | 10 | 20 | — |
| PVC2* | 1.6 | — | — | — | — | — | — |
| I MOD.* | | 8 | 8 | 8 | 8 | 8 | 13 |

*wt. parts

TABLE 2B

| | Example | | | | | |
| | C1 | 2 | 3 | 4 | 5 | C6 |
|---|---|---|---|---|---|---|
| Izod RT N | 18 | 18.4 | 18.2 | 19.2 | 19.1 | 18 |
| Izod RT UN | 39.9 | 39.6 | 40.0 | 40.0 | 40.0 | 40.0 |
| Izod −40 N | 8.07 | 5.47 | 11.1 | 7.2 | 3.5 | 3.7 |
| Izod −40 UN | 36.7 | 37.5 | 40.0 | 31 | 40 | 22.7 |
| HDT 66 psi | 72.5 | 72 | 72.5 | 71.5 | 70.5 | 74.5 |
| VICAT B | 84 | 84 | 84.5 | 84 | 87.5 | 85 |
| Spiral Flow (in.) | 21 | 21 | 20 | 19.5 | 18.5 | 18.8 |
| Lo Shear Visc. | 14,566 | 15,607 | 16,283 | 15,451 | 19,144 | 16,283 |
| DTS (min.) | 12 | 12 | 11 | 11 | 10 | 10 |

Table 2B illustrates the properties obtained from an evaluation of the examples comprising the components listed in Table 2A. Examples 2-5 represent a series of PVC/PVC blends having a ΔI.V. (0.92-0.68) equal to 0.24 units wherein the major component PVC (PVC1) as in all examples of the present invention has a lower I.V. Examples 2 and 3 illustrate that a preferred balance of properties can be obtained by incorporation of a minor amount of PVC2 having an I.V. 0.24 units higher than PVC1. Examples 2 and 3 compare favorably to Examples C1 and C6 absent PVC2. Examples 2 and 3 achieve comparable impact strength with impact modifier alone either at 8 parts or at 13 parts as in Examples C1 or C6. Spiral flow was not significantly diminished in Examples 2-5 vs. C1. It was unexpected that Example 3, having 5 parts of PVC2 and the same level of impact modifier as in Example 1 would yield the observed, combination of impact strength HDT, VICAT B, spiral flow and DTS time. Example 5 illustrates loss in some impact properties, HDT, low shear viscosity, spiral flow and DTS time by the incorporation of 20 parts of PVC2 and is not as desirable.

TABLE 3A

|  | Example | | | | | |
|---|---|---|---|---|---|---|
|  | C1 | 8 | 9 | 10 | 11 | 12 |
| PVC1* IV 0.68 | 100 | 99 | 97 | 95 | 90 | 80 |
| PVC2* IV 0.92 | — | — | — | — | — | — |
| PVC2* IV 1.6 | — | 1 | 3 | 5 | 10 | 20 |
| I MOD.* | 8 | 8 | 8 | 8 | 8 | 8 |

*wt. parts

TABLE 3B

|  | Example | | | | | |
|---|---|---|---|---|---|---|
|  | C1 | 8 | 9 | 10 | 11 | 12 |
| Izod RT N | 18 | 19.5 | 18.6 | 19.4 | 18.9 | 18.1 |
| Izod RT UN | 39.9 | 40 | 39.9 | 39.9 | 39.8 | 40.0 |
| Izod −40 N | 8.07 | 9.9 | 4.0 | 6.3 | 7.1 | 7.0 |
| Izod −40 UN | 36.7 | 40.0 | 29.7 | 39.8 | 39.7 | 39.7 |
| HDT 66 psi | 72.5 | 72.5 | 73.5 | 73 | 71.5 | 73.5 |
| VICAT B | 84 | 85 | 85 | 88.5 | 89.5 | 87 |
| Spiral Flow (in.) | 21 | 21.2 | 20.7 | 17.7 | 19 | 17.5 |
| Visc. (poise) | 14,566 | 13,734 | 14,306 | 15,711 | 16,075 | 21,849 |
| DTS (min.) | 12 | 12 | 12 | 10 | 10 | 8 |

Tables 3A and 3B illustrate a series of PVC/PVC blends wherein the ΔI.V. is equal to 0.92 units (1.60−0.68). The composition of Example 8 comprising 1 weight part of PVC2 having I.V. of 1.6 yielded a desirable combination of impact strength, low shear viscosity, spiral flow, Vicat B and DTS time. Unexpectedly, at 20 weight parts PVC2 as in Example 12, an unacceptable combination of properties were found, in particular, a significant rise in low shear viscosity renders this composition difficult to process.

TABLE 4A

|  | I.V. | Example | | | | | |
|---|---|---|---|---|---|---|---|
|  |  | C13 | 14 | 15 | 16 | 17 | 18 |
| PVC1* | 0.46 | 100 | 99 | 97 | 95 | 90 | 80 |
| PVC2* | 0.92 | 0 | 1 | 3 | 5 | 10 | 20 |
| PVC2* | 1.6 | — | — | — | — | — | — |
| I Mod* | — | 8 | 8 | 8 | 8 | 8 | 8 |

*wt. parts

TABLE 4B

|  | Example | | | | | |
|---|---|---|---|---|---|---|
|  | C13 | 14 | 15 | 16 | 17 | 18 |
| Izod RT N | 0.3 | 10.3 | 6.7 | 0.9 | 11.5 | 10.0 |
| Izod RT UN | 39.8 | 23.3 | 39.6 | 39.7 | 39.5 | 40 |
| Izod −40 N | 0.8 | 2.8 | 0.6 | 3.8 | 0.8 | 3.3 |
| Izod −40 UN | 13.6 | 16.8 | 33.6 | 21.5 | 27.7 | 35.3 |
| HDT 66 psi | 70.5 | 69 | 72 | 70.5 | 69.5 | 68.5 |
| VICAT B | 80.5 | 79.5 | 80.5 | 82 | 80.5 | 83.5 |
| Spiral Flow (in.) | 39.5 | 41.5 | 38.5 | 41.5 | 38.5 | 29.5 |
| Lo Shear Visc. | 5098 | 4422 | 5202 | 4994 | 6087 | 7803 |
| DTS (min.) | 12 | 12 | 11 | 12 | 11 | 10 |

Tables 4A and 4B illustrate a series of PVC1/PVC2 blends having a ΔI.V. of 0.46 units. An increase in notched Izod impact strength both at room temperature and at −40° F. occurred for Example 14 employing just one weight part of PVC2. Impact properties generally trend upward in Examples 13-18, spiral flow however is not reduced to a significant degree up to 10 wt. parts of PVC2. In addition, low shear viscosity did not rise significantly nor was DTS time reduced to a significant degree. These changes in properties are generally favorable compared to C13, C19 and C20.

TABLE 5A

|  | Example | | | | | | |
|---|---|---|---|---|---|---|---|
|  | C19 | C20 | 21 | 22 | 23 | 24 | 25 |
| PVC1* IV .46 | 100 | 100 | 100 | 99 | 95 | 90 | 80 |
| PVC2* IV .92 | — | — | — | — | — | — | — |
| PVC2* IV 1.6 | — | — | 1 | 3 | 5 | 10 | 20 |
| I MOD* | 13 | 18 | 8 | 8 | 8 | 8 | 8 |

*wt. parts

TABLE 5B

|  | Example | | | | | | |
|---|---|---|---|---|---|---|---|
|  | C19 | C20 | 21 | 22 | 23 | 24 | 25 |
| Izod RT N | 8.4 | 9.6 | 2.0 | 2.6 | 2.3 | 4.1 | 14.4 |
| Izod RT UN | 39.7 | 39.7 | 39.7 | 39.7 | 39.8 | 40 | 40.2 |
| Izod −40 N | 0.6 | 2.3 | 0.9 | 3.7 | 1.1 | 2.4 | 3.1 |
| Izod −40 UN | 22.5 | 39.8 | 37.1 | 36.8 | 34.3 | 18 | 10 |
| HDT 66 psi | 70 | 70 | 71.5 | 69.5 | 69.5 | 70.5 | 70.5 |
| VICAT B | 79.5 | 81.5 | 80.5 | 81 | 82.5 | 80.5 | 87.5 |
| Spiral Flow (in.) | 38.5 | 31.8 | 42.5 | 40 | 38.5 | 35 | 25.8 |
| Lo Shear Visc. | 5202 | 6503 | 4,526 | 5,618 | 5,983 | 7,439 | 11,705 |
| DTS (min.) | 10 | 8 | 10 | 10 | 10 | 10 | 8 |

Tables 5A and 5B represent Examples C19-25, a series of PVC/PVC blends having a ΔI.V. of 1.14 units wherein the I.V. of PVC1 is 0.46. Examples 21-25 compare favorably with C13 having no PVC2 component. Generally, impact properties for Example 21-25 are comparable to C13 and C19. Spiral flow, VICAT B and HDT are minimally affected. Examples 21-23 having 1, 3 and 5 weight parts of PVC2 having an I.V. of 1.6 exhibit impact properties comparable to C13 with equal level of impact modifier as well as C19 having a higher level of impact modifier. Spiral flow, VICAT B and DTS times are not reduced, and in some cases are improved. Where the ΔI.V. of the blend ranges from about 1.0 to about 2.0, the amount of PVC2 preferably will not exceed about 20 weight parts, and most preferably will not exceed 10 weight parts based on 100 weight parts of combined PVC.

BLENDS WITH Tg ENHANCING ADDITIVES

The following examples illustrate compositions further comprising commercially available Tg enhancing additives. Any suitable such additive may be incorporated into the PVC/PVC blend wherein the Tg of the blend is increased. There may be one higher Tg or two Tg's exhibited by the combination depending on the miscibility of the components. The Tg enhancing additive can be incorporated in an amount ranging from 1 to about 400 weight parts per 100 weight parts of the combined weight of PVC, and preferably the Tg enhancing additive is present at from 20 to about 300 weight parts per 100 weight parts of the combined weight of PVC. Examples of Tg enhancing additives are α-methyl styrene derivatives and imide derivatives, including copolymers, terpolymers and tetrapolymers. Block or graft versions are also contemplated. Specific preferred examples include a styrene-α-methylstyrene-acrylonitrile terpolymer, imidized polymethylmethacrylate, an imide polymethylmethacrylate copolymer, a tetrapolymer of styrene, α-methyl styrene, acrylonitrile and N-cyclohexyl maleimide, and a tetrapolymer of styrene, α-methyl styrene, acrylonitrile and N-phenyl maleimide.

EXAMPLES 26–47

A first and second PVC, selected according to the ΔI.V. relationship, were blended with a Tg enhancing additive specified in Tables 6, 7 and 8. The composition further contained 2 weight parts of tin stablizer and 2 weight parts of di-butyl phosphite, 17 weight parts of an impact modifier, 3.5 parts of lubricants and 1.8 parts of a processing aid. Variable height impact testing (VHIT) was conducted similarly per ASTM-D2444. Oven sag testing was conducted at 200° F. (93° C.) wherein sag deflection was recorded in millimeters after 1 hour of heat soak.

TABLE 6

|  | I.V. | Example | | | | |
|---|---|---|---|---|---|---|
|  |  | C26 | 27 | 28 | 29 | 30 |
| PVC1* I.V. 0.55 | 0.55 | 50 | 48 | 43 | 40 | 30 |
| PVC2* I.V. 0.92 | 0.92 | — | 2 | 7 | 10 | 20 |
| Tg MOD* 1* |  | 50 | 50 | 50 | 50 | 50 |
| VHIT 2* Ft.-Lb. (J) |  | 26(35) | 24(32) | 32(43) | 30(40) | 40(54) |
| Sag 3* (mm) |  | 36 | — | 30 | 30 | 26 |

* wt. parts
1* Tellalloy A-60 ex. KanegaFuchi Chemical Industry Co. Ltd.
2* ½ inch (12.7 mm) conical dart on a 60 mil (1.52 mm) sample.
3* Measured in mm. at 200° F. (93° C.) after 1 hour.

As is shown in Table 6, preferred blends in Examples 28–30 show that drop dart impact was increased compared with Example C26 absent PVC2. At the same time, owing to the presence of the Tg enhancing agent (Tg mod) oven sag was reduced in these examples and is desired.

TABLE 7

|  | I.V. | Example | | | | |
|---|---|---|---|---|---|---|
|  |  | C31 | 32 | 33 | 34 | 35 |
| PVC1* I.V. 0.55 | 0.55 | 50 | 48 | 43 | 40 | 30 |
| PVC2* I.V. 0.92 | 0.92 | 0 | 2 | 7 | 10 | 20 |
| Tg MOD* 2* |  | 50 | 50 | 50 | 50 | 50 |
| VHIT Ft.-Lb. (J) |  | 20(27) | 32(43) | 20(27) | 36(49) | 16(22) |
| SAG (mm) |  | 16 | — | 14 | 20 | 15 |

*wt. parts
2* Blendex ® 586, ex GE Plastics Inc.

As illustrated in Table 7 using another Tg enhancing agent, drop dart impact was significantly improved in Examples 32–34 compared to Example C31 while in some instances oven sag was reduced as in Examples 33 and 35. Generally, incorporation of the minor amount of a second PVC having higher I.V. than the first PVC will not reduce sag resistance in combination with a Tg modifier.

TABLE 8

|  | I.V. | Example | | | | | |
|---|---|---|---|---|---|---|---|
|  |  | C42 | 43 | 44 | 45 | 46 | 47 |
| PVC1* I.V. 0.55 | 0.55 | 50 | 63 | 53 | 43 | 65 | 60 |
| PVC2* I.V. 0.92 | 0.92 | 0 | 7 | 7 | 7 | 5 | 10 |
| Tg MOD* 3* |  | 50 | 30 | 40 | 50 | 30 | 30 |
| VHIT Ft.-Lb. (J) |  | 4(5) | 96(130) | 22(29) | 6(8) | 88(119) | 112(151) |
| SAG (mm) |  | 3 | 58 | 10 | 0 | 65 | 70 |

*wt parts
3* Paraloid ® HT-510, ex Rohm and Haas Inc.

Table 8 illustrates similar effects using a different Tg enhancing agent. In Examples 43–47 drop dart impact strength was increased while oven sag evidenced improvements in proportion to the amount of Tg modifier. Example 45 represents a particularly preferred embodiment of a composition containing a Tg enhancing agent wherein zero sag was obtained.

Various changes and modifications may be made in carrying out the present invention without departing from the spirit and scope thereof. While in accordance with the patent statutes, the best mode and preferred embodiment has been set forth. The scope of the invention is not limited thereto, but rather by the scope of the attached claims.

What is claimed is:

1. A rigid blend composition comprising a first uncrosslinked polyvinyl chloride polymer (PVC) having an inherent viscosity measured per ASTM-D1243 (I.V) up to about 0.55,
from 0.1 to about 10 weight parts per 100 weight parts combined polyvinyl chloride of a second uncrosslinked polyvinyl chloride polymer having an inherent viscosity of from 0.8 to 1.6,
and an impact modifier wherein the inherent viscosity for said second polyvinyl chloride must be from 0.2 to 1.0 inherent viscosity units higher (ΔI.V.) than said inherent viscosity for said first polyvinyl chloride.

2. The composition of claim 1 wherein said inherent viscosity for said second polyvinyl chloride is from about 0.35 to about 0.65 units higher than said inherent viscosity for said first polyvinyl chloride.

3. The composition of claim 1 wherein said inherent viscosity for said second polyvinyl chloride is from 0.9 to 1.05.

4. The composition of claim 1 further comprising at least one component selected from the group consisting of lubricant(s), processing aid(s), stabilizer(s), pigment(s), filler(s), antioxidant(s), and colorant(s).

5. The composition of claim 4 wherein said second polyvinyl chloride is present at from 1.0 to about 5 weight parts based on 100 weight parts of the combined weight of said first and said second polyvinyl chloride.

6. The composition of claim 4 wherein said impact modifier is present at from 5 to 20 weight parts based on 100 weight parts of said first and said second polyvinyl chloride, and further comprising from 1 to 400 weight parts per 100 weight parts of the combined weight of PVC of a Tg enhancing additive selected from the group consisting of a styrene, α-methyl styrene, acrylonitrile terpolymer, imidized polymethylmethacrylate terpolymers, a tetrapolymer of styrene, α-methyl styrene, acrylonitrile and N-cyclohexyl maleimide, and a tetrapolymer of styrene, α-methyl styrene, acrylonitrile and N-phenyl maleimide.

7. The composition of claim 6 wherein said impact modifier is present at from 5 to 12 weight parts based on 100 weight parts of the combined weight of said first and said second polyvinyl chloride.

8. The composition of claim 7 wherein said first polyvinyl chlroide is present at from about 90 to 99 weight parts, said second polyvinyl chloride having an I.V. of from 0.35 to 0.65 units higher than said first polyvinyl chloride is present at from about 1 to about 10 weight parts, and said Tg enhancing additive is present at from 20 to 300 weight parts per 100 weight parts of the combined weight of said first and said second polyvinyl chloride.

9. A composition of claim 1 in a fused state.

10. A rigid article comprising from about 90 to 99 parts by weight of a first uncrosslinked polyvinyl chloride polymer having an inherent viscosity measured similarly per ASTM-D1243 of up to about 0.55 in combination with from 1 to 10 parts by weight of a second uncrosslinked polyvinyl chloride polymer having an inherent viscosity of from 0.8 to 1.6, at least one stabilizer and at least one impact modifier, wherein said inherent viscosity for said second polyvinyl chloride must be from 0.2 to 1.0 units higher than said inherent viscosity for said first polyvinyl chloride.

11. A process for obtaining an improved balance of properties for a rigid PVC composition including impact resistance, heat deflection temperature, melt viscosity and melt flow rate comprising: admixing an impact modifier, a first uncrosslinked polyvinyl chloride and a second uncrosslinked polyvinyl chloride wherein said first polyvinyl chloride polymer (PVC) has an inherent viscosity measured similarly per ASTM-D1243 of up to about 0.55, and said second polyvinyl chloride polymer has an inherent viscosity of from 0.8 to 1.6, wherein said inherent viscosity for said second polyvinyl chloride must be from 0.2 to 1.0 units higher than said inherent viscosity for said first polyvinyl chloride.

* * * * *